Patented Mar. 18, 1952

2,589,591

UNITED STATES PATENT OFFICE 2,589,591

METHOD OF CONTROLLING COLOR AND FLAVOR IN POTATO CHIPS

Paul A. Xander, Nescopeck, Pa., assignor to Wise Potato Chip Company, Berwick, Pa., a corporation of Pennsylvania No Drawing. Application December 18, 1950, Serial No. 201,501

12 Claims. (Cl. 99—100)

This invention relates to a method of treating potato slices employed in the manufacture of potato chips, the primary purpose of which is to produce a uniform potato chip, in regard to both flavor and color, throughout the entire year regardless of the variety of potatoes used or the reducing sugar content of the same.

Any variety of potato when held at a low temperature will go into a dormant stage in which starch is converted to reducing sugars. If this reducing sugar content is over 0.3% by weight, the resulting potato chips from such tubers will be of a dark color due to the formation of hydroxymethylfurfural which is formed by the interaction of various amino acids and the reducing sugars present in the potato. Manifestly, the higher the reducing sugar content in the tubers, the darker will be the potato chip when fried in fats or oils. The reaction producing hydroxymethylfurfural is almost instantaneous at temperatures of 325° F. and the dark color of the chips due to this action is definitely different from the dark color produced in raw vegetables or potatoes when the cut or peeled surface is exposed to air, and which is known as melanin.

The accepted practice in potato chip manufacturing is to maintain the potatoes at a temperature of approximately 70° F. for a period of time and at this temperature the starch to sugar conversion is reversed in which approximately 20% of the reducing sugars are converted to starch and 80% given off as water and carbon dioxide. Unless virus and bacterial infections are present in the potato, the above lowering of the reducing sugar content is readily effected because of the presence of enzymes in the potato. It is the primary object of the present invention to so treat peeled and sliced potatoes that when the slices are fried in fats or oil to produce potato chips, the resultant chips will be uniform in color and have enhanced flavor and nutritional components.

The process comprises broadly the immersion of peeled, washed and sliced potatoes in an aqueous solution containing sulfur dioxide under controlled conditions to remove the hydroxymethylfurfural-forming reducing sugars. This sulfur dioxide treatment is followed by a washing with water to remove the sulfur dioxide, furfural and reducing sugars and thereafter the washed slices are transferred to an aqueous solution containing a reducing sugar and a protein hydrolyzate extracted from the raw tubers or potatoes in a particular manner as will be described hereinafter. The treated slices are then heated for a relatively short time to fix the flavor and partially evaporate the moisture from the surface of the slices so that the frying time for the production of the potato chips could be reduced.

Inasmuch as one of the important steps in the present process is the treatment of the sliced potatoes with a particular type of protein hydrolyzate, the amino acid content of this particular protein hydrolyzate will be described immediately hereinafter as well as the process of producing the protein hydrolyzate. The protein hydrolyzate composition and method of producing the same are fully described in my co-pending application Serial No. 194,036, filed November 3, 1950. The method of producing the protein hydrolyzate is as follows. Approximately one kilogram of whole raw tubers are agitated with a small quantity of water until such time as the desired amount of raw slurry is obtained. The suspended solid matter in the slurry is removed and the liquid fraction, approximately one liter, is treated with five grams of a finely ground alkaline earth oxide or hydroxide, such as calcium oxide, under constant agitation for five minutes. The precipitated saccharides are removed by filtration, the procedure being carried out at room temperature or approximately 70° F., the pH of the filtrate being approximately 8.5.

The filtrate is then treated with 5% of its volume of concentrated hydrochloric acid and refluxed for a total of six hours at atmospheric pressure at a temperature of approximately 212° F. After the darkened insoluble humin is filtered off, the filtrate is then passed through an anion exchange column of Amberlite IR-4B and a second column containing Amberlite IR-120. The Amberlite IR-4B is a weakly basic modified amine type anion exchange resin whereas Amberlite IR-120 is a cation exchanger of the nuclear sulfonic-acid type. The effluent from these exchange resins has a pH of approximately 6.3 and is free from hydrochloric acid and other mineral acids and mineral salts, such as calcium chloride. The amino acids are present in the solution in the form of their sodium salts.

The solution is then concentrated under a reduced pressure of twenty-seven inches of mercury at a boiling point of 60° C. to approximately 15 milliliters, at which point a substantial amount of crystallization occurs. The material is then evaporated in a vacuum oven at 85° C. and twenty-nine inches of mercury, and the final product is a tan semi-crystalline mass with a sweet odor and a very appealing flavor. This protein hydrolyzate contains the following amino acids in percentage by weight, plus or minus 2%:

| | Percent |
|---|---|
| Glutamic acid | 26 |
| Aspartic acid | 20 |
| Glycine | 4 |
| Alanine | 2 |
| Leucine | 1 |
| Threonine | 3 |
| Lycine | 6 |
| Histidine | 15 |
| Methionine | 6 |
| Asparagine | 4 |
| Arginine | 6 |
| Valine | 6 |
| Phenylalanine | 1 |

It will be understood that the hydrolyzate produced from potatoes, regardless of variety, will show a definite quantitative and quantitative analysis as indicated in the above table. It will also be understood that the term "protein hydrolyzate" employed throughout the specification and the claims shall mean the composition described in the table immediately herein above and produced in the manner disclosed.

The actual details of the present process are fully described below in successive stages indicated by Roman numerals.

I

The raw tubers or potatoes are peeled, washed, and sliced and are then immersed in a tank holding water with 0.5 to 5.0% by weight free sulfur dioxide, the aqueous solution having a pH of 1.5 to 3.0. Any suitable means may be employed for producing free sulfur dioxide in solution, such as acidified sulfites or bisulfites, but it has been found that the concentration and pH is best controlled by the flow of sulfur dioxide gas from a sulfur burner or sulfur dioxide cylinder of compressed sulfur dioxide gas. The concentration of sulfur dioxide in solution is determined by titration to color-removal end point with a 0.1 N solution of iodine. The bath is maintained at a temperature not to exceed 90° F., and preferably at a room temperature of 70° F., and the slices are immersed in the bath for a period of thirty seconds to five minutes depending upon the reducing sugar content in the potato slices. This length of time will remove the hydroxymethylfurfural-forming reducing sugars and will block the chemical reaction resulting in hydroxymethylfurfural formation.

II

The potato slices are then transferred to a tank of water maintained at a temperature not to exceed 90° F., but preferably room temperature, a continuous stream of fresh water assuring the removal of sulfur dioxide, furfural, and reducing sugars. The length of time that this washing operation is carried out may vary from one minute to fifteen minutes, depending upon the previous concentration of the sulfur dioxide bath, and must be sufficient to remove the above components so that the residual sulfur dioxide content of the slices will not exceed 0.01% by weight.

III

From this washing tank the slices are transferred to another tank containing water, a reducing sugar, and the protein hydrolyzate, the temperature of the solution not exceeding 90° F. and having a pH of 5.0 to 6.5. The protein hydrolyzate may be present in solution in the form of either the sodium salts or the hydrochloride salts of the amino acids and any suitable reducing sugar may be employed, such as dextrose or maltose, but preferably maltose. The solution is made of 1.0 to 3.0% by weight of the reducing sugar and 1.0 to 4.0% by weight of the protein hydrolyzate. The concentration of the bath, both with regard to the reducing sugar and the protein hydrolyzate, is kept constant by continuously removing a portion of the bath which contains tuberin in a colloidal form and replacing with fresh reducing sugar and protein hydrolyzate. If a solution is employed which contains 1.0% by weight of reducing sugar and 1.5% by weight of the protein hydrolyzate, from thirteen hundred to fifteen hundred pounds of raw tuber slices can be dipped in this solution with the use of one pound of the prepared protein hydrolyzate. The dipping time will vary from five seconds to three minutes depending upon the flavor and color desired. This dipping solution imparts a distinct natural flavor and color to the potato chips.

IV

From the color and flavor bath, the slices are passed through an oven heated to a temperature of approximately 1200° F. for a period varying between ten and thirty seconds. This fixes the flavor and partially evaporates the moisture from the surface of the slices thereby cutting down the frying time of the slices for the production of the potato chips. From this oven the slices are then transferred directly to the frying machines.

Several modifications of the process may be made as follows:

Modification I

The dipping solution described in paragraph III above, may have a protein hydrolyzate content ranging from 0.5 to 1.0% by weight and a reducing sugar content of 1.0 to 3.0% by weight. Following the dipping and drying process, the treated potato slices are fried in suitable fats or oils to produce the potato chips that are subsequently packaged. Just prior to the distribution of the potato chips to the packing machines, the protein hydrolyzate may be sprayed upon the potato chips in a dry powder form of a particle size which will pass through a three hundred mesh sieve. Since the material is hygroscopic, it must first be warmed, then dried and is best distributed over the chips by the use of a blast of hot air. The distribution will be at such a rate that one pound of the moisture-free hydrolyzate will uniformly treat four hundred to five hundred pounds of potato chips.

Modification II

Instead of blowing the protein hydrolyzate over the potato chips with a blast of hot air, as noted in the paragraph immediately herein above entitled Modification I, a 1.5 to 4.0% by weight aqueous solution of the protein hydrolyzate may be made up and sprayed over the finished chips so that the total quantity of the solution containing one pound of protein hydrolyzate will uniformly spray, in mist form, four to five hundred pounds of finished potato chips. This spray solution may be maintained at room temperature of approximately 70° F.

It will be seen that a novel process is provided for the treatment of potato slices to be used in the making of potato chips wherein both the color and the flavor in the resultant slices can be readily controlled and will also be uniform. While a preferred embodiment of the process has been described herein above, it will be understood that those skilled in the art can make minor variations in the process without departing from the spirit of the invention and the scope of the appended claims.

Having described the invention, what is claimed as new is:

1. A process of controlling color and flavor in potato slices used in making potato chips comprising immersing sliced peeled potatoes in a sulfur dioxide-containing bath, removing the slices and washing with water, immersing the washed slices in an aqueous solution of a reducing sugar and a protein hydrolyzate derived from raw potatoes, and drying the treated slices.

2. The process of claim 1 wherein the sulfur dioxide-containing bath includes 0.5 to 5.0% by weight free sulfur dioxide, the bath having a pH of 1.5 to 3.0.

3. The process of claim 2 wherein the slices are washed to remove sulfur dioxide, furfural and reducing sugars to the extent that not over 0.01% by weight of residual sulfur dioxide remains in the slices.

4. The process of claim 1 wherein the aqueous solution includes 1.0 to 3.0% by weight reducing sugar and 1.0 to 4.0% protein hydrolyzate, the pH of the solution being 5.0 to 6.5.

5. The process of claim 4 wherein the protein hydrolyzate comprises the following amino acids in percentage by weight ±2%; glutamic acid 26%, aspartic acid 20%, glycine 4%, alanine 2%, leucine 1%, threonine 3%, lycine 6%, histidine 15%, methionine 6%, asparagine 4%, arginine 6%, valine 6%, phenylalanine 1%.

6. The process of claim 5 and the step of depositing dry powdered protein hydrolyzate on the treated potato slices after the latter have been fried in fat.

7. A process of controlling color and flavor in potato slices used in making potato chips comprising immersing sliced peeled potatoes in a sulfur dioxide-containing bath, removing the slices and washing with water, immersing the washed slices in an aqueous solution of a reducing sugar and a protein hydrolyzate derived from raw potatoes, drying the treated slices, frying the slices in fat and then spraying a dilute aqueous solution of the protein hydrolyzate on the fried slices.

8. A process of controlling color and flavor in potato slices used in making potato chips comprising immersing sliced peeled potatoes in an aqueous solution containing 0.5 to 5.0% by weight free sulfur dioxide, removing the slices and washing with water until not over 0.01% by weight of residual sulfur dioxide remains in the slices, immersing the washed slices in an aqueous solution containing 1.0 to 3.0% by weight of a reducing sugar and 1.0 to 4.0% by weight of a protein hydrolyzate derived from raw potatoes, said protein hydrolyzate comprising the following amino acids in percentage by weight, ±2% glutamic acid 26%, aspartic acid 20%, glycine 4%, alanine 2%, leucine 1%, threonine 3%, lycine 6%, histidine 15%, methionine 6%, asparagine 4%, arginine 6%, valine 6%, phenylalanine 1%, and drying the treated slices.

9. The process of claim 8 wherein the pH of the sulfur dioxide-containing solution is 1.5 to 3.0 and the potato slices are maintained therein for 30 seconds to 5 minutes at a temperature not over 90° F.

10. The process of claim 9 wherein the protein hydrolyzate solution is maintained at a pH of 5.0 to 6.5 and not over 90° F. and the slices are immersed therein for 5 seconds to 3 minutes.

11. The process of claim 10 wherein the treated slices are dried at approximately 1200° F. for 10 to 30 seconds.

12. The process of claim 11 and the step of depositing an aqueous solution of 1.5 to 4.0% by weight of protein hydrolyzate on the fried slices.

PAUL A. XANDER.

REFERENCES CITED

The following references are of record in the file of this patent:

UNITED STATES PATENTS

| Number | Name | Date |
|---|---|---|
| 2,414,299 | Hall | Jan. 14, 1947 |
| 2,420,322 | Matarazzo | May 13, 1947 |
| 2,441,305 | Wilson | May 11, 1948 |
| 2,448,152 | Patton | Aug. 31, 1948 |
| 2,494,258 | Nickol | Jan. 10, 1950 |
| 2,498,024 | Baxter | Feb. 21, 1950 |
| 2,506,793 | Kalmar et al. | May 9, 1950 |